Figure 4:
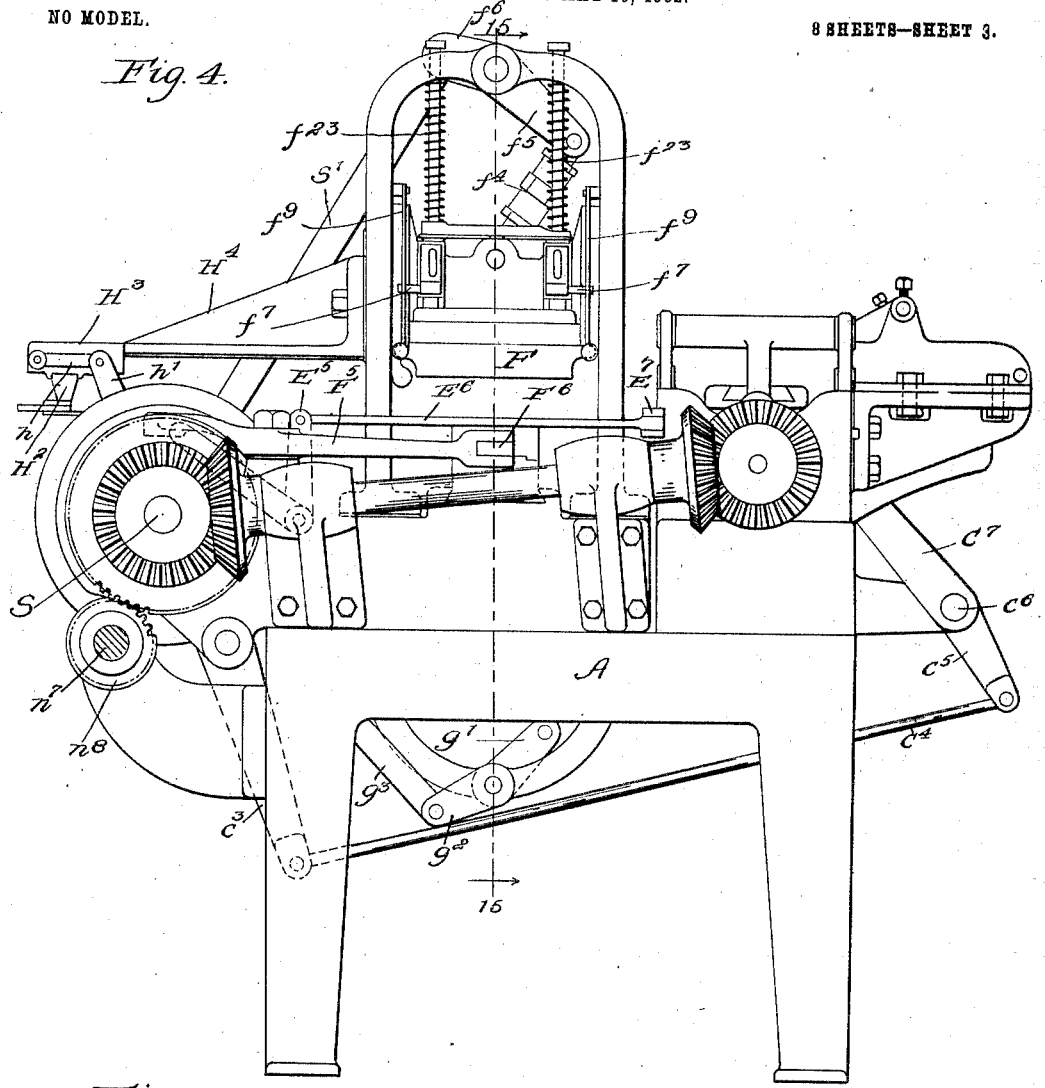

No. 775,880. PATENTED NOV. 22, 1904.
H. B. WILLIAMS & F. M. LEAVITT.
COMBINED CAN BODY FORMING AND SIDE SEAM SOLDERING MACHINE.
APPLICATION FILED MAY 16, 1902.
NO MODEL. 8 SHEETS—SHEET 1.
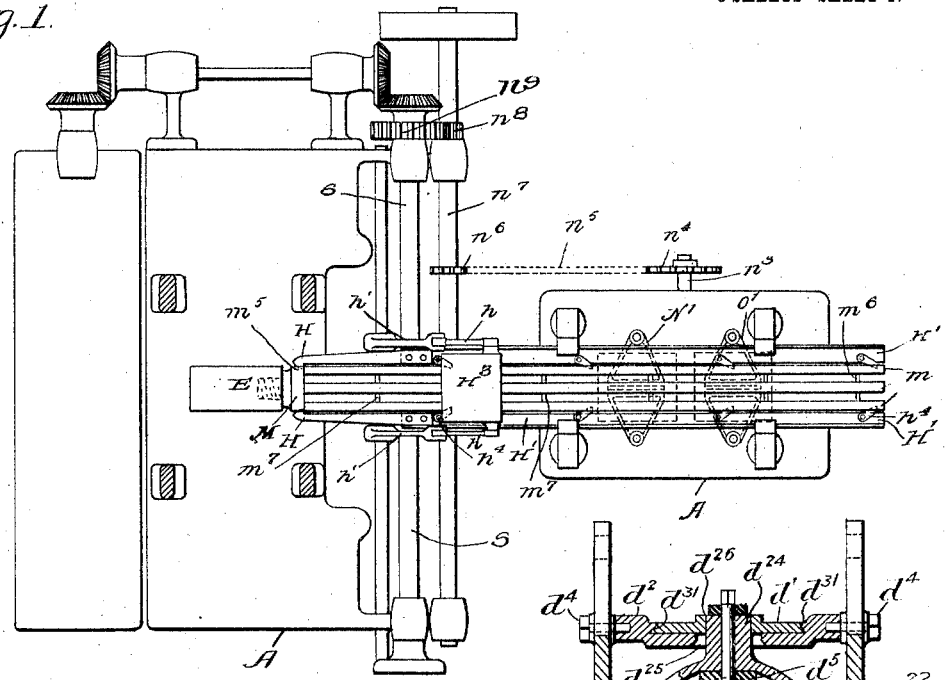
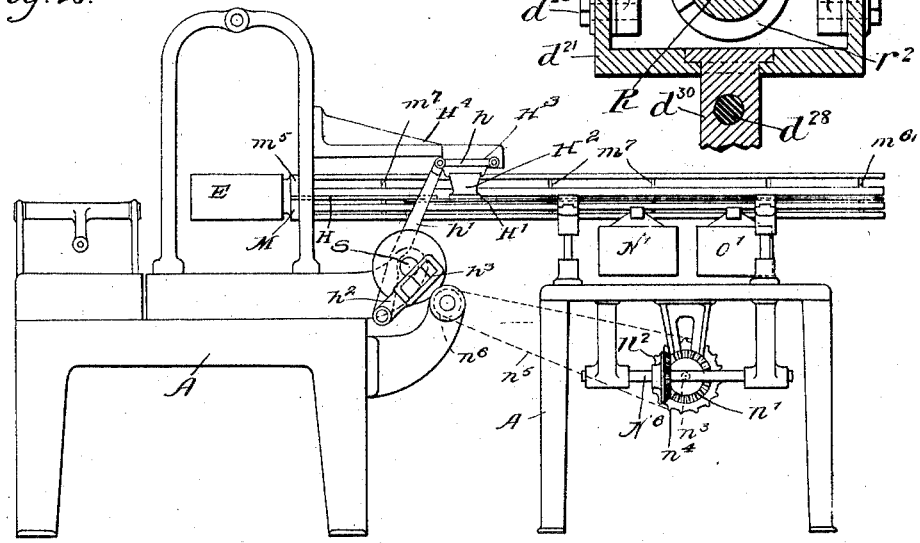
WITNESSES:
Wm. Geiger
H. W. Munday
INVENTORS.
Harry B. Williams.
Frank M. Leavitt.
BY
Munday, Evarts & Adcock
ATTORNEYS.

No. 775,880. PATENTED NOV. 22, 1904.
H. B. WILLIAMS & F. M. LEAVITT.
COMBINED CAN BODY FORMING AND SIDE SEAM SOLDERING MACHINE.
APPLICATION FILED MAY 16, 1902.
NO MODEL. 8 SHEETS—SHEET 2.
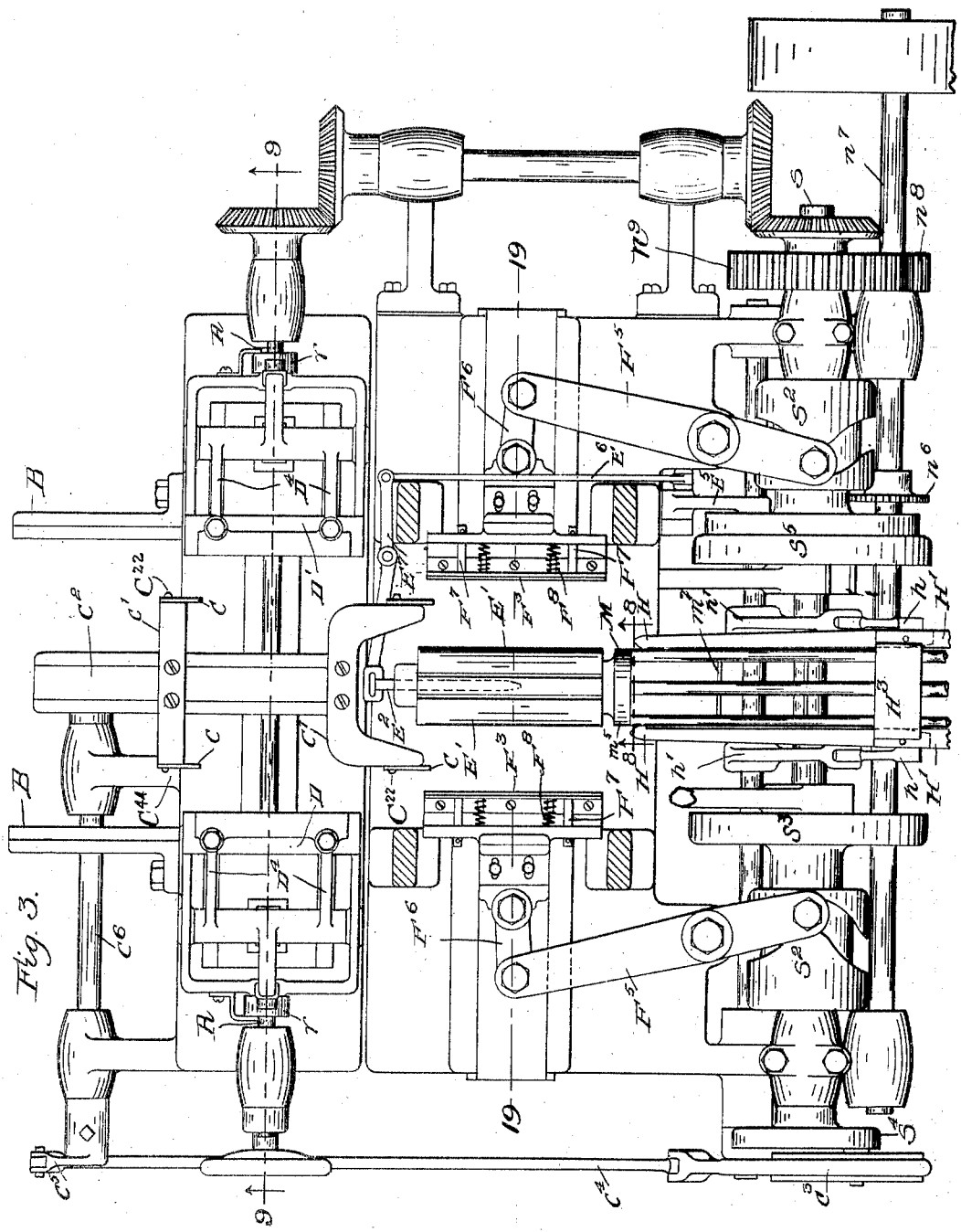
WITNESSES:
Wm. Geiger
A. W. Munday
INVENTORS.
Harry B. Williams
Frank M. Leavitt
BY
Munday, Evarts & Adcock
ATTORNEYS.

No. 775,880. PATENTED NOV. 22, 1904.
H. B. WILLIAMS & F. M. LEAVITT.
COMBINED CAN BODY FORMING AND SIDE SEAM SOLDERING MACHINE.
APPLICATION FILED MAY 16, 1902.
NO MODEL. 8 SHEETS—SHEET 3.

WITNESSES:
Wm. Geiger
INVENTORS.
Harry B. Williams
Frank M. Leavitt
BY
Munday, Evarts & Adcock
ATTORNEYS.

No. 775,880. PATENTED NOV. 22, 1904.
H. B. WILLIAMS & F. M. LEAVITT.
COMBINED CAN BODY FORMING AND SIDE SEAM SOLDERING MACHINE.
APPLICATION FILED MAY 16, 1902.
NO MODEL. 8 SHEETS—SHEET 4.
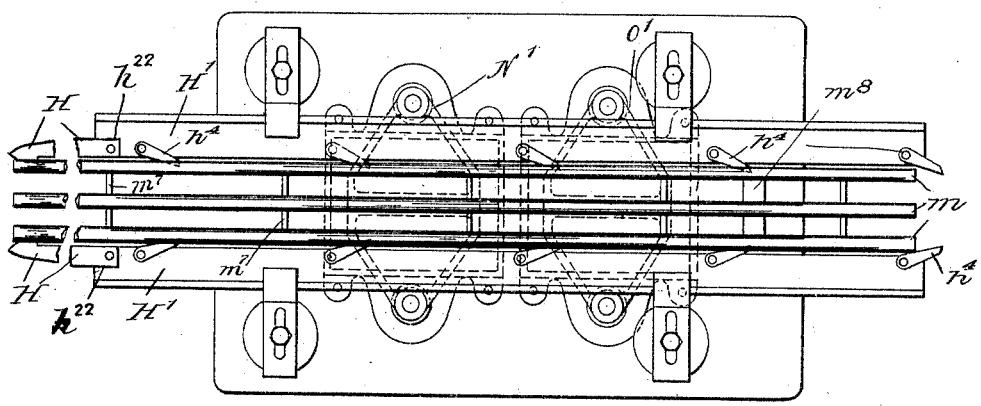
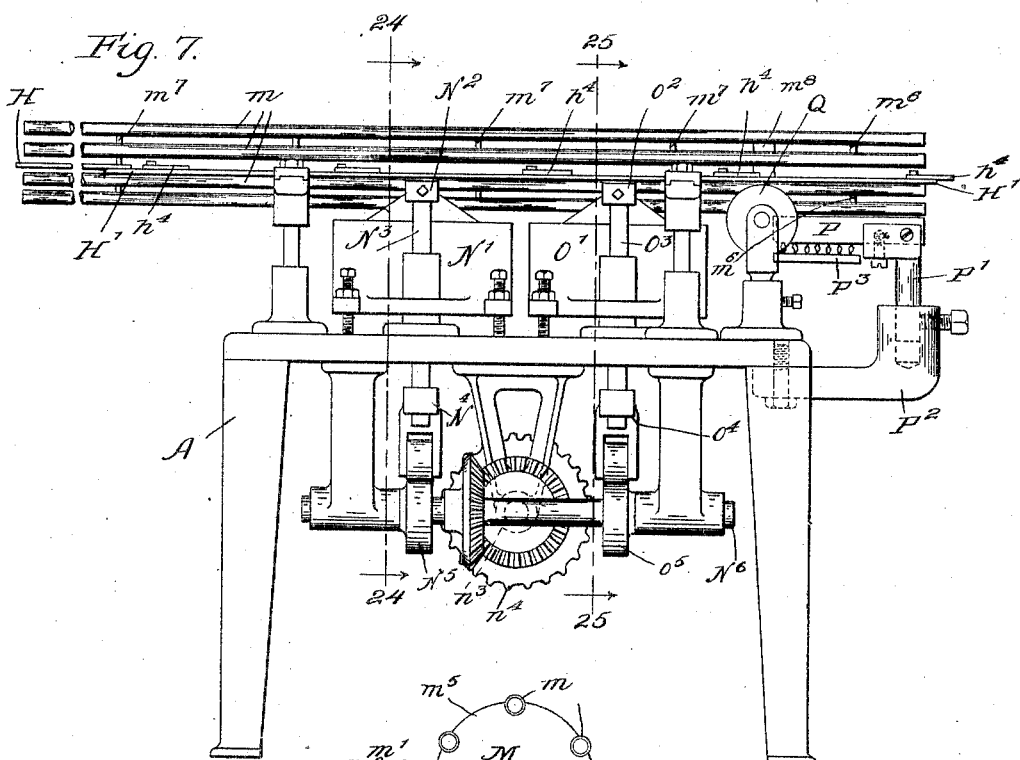
WITNESSES:
Wm. Geiger
A. W. Munday.
INVENTORS.
Harry B. Williams.
Frank M. Leavitt.
BY
Munday, Evarts & Adcock,
ATTORNEYS.

No. 775,880. PATENTED NOV. 22, 1904.
H. B. WILLIAMS & F. M. LEAVITT.
COMBINED CAN BODY FORMING AND SIDE SEAM SOLDERING MACHINE.
APPLICATION FILED MAY 16, 1902.
NO MODEL. 8 SHEETS—SHEET 5.
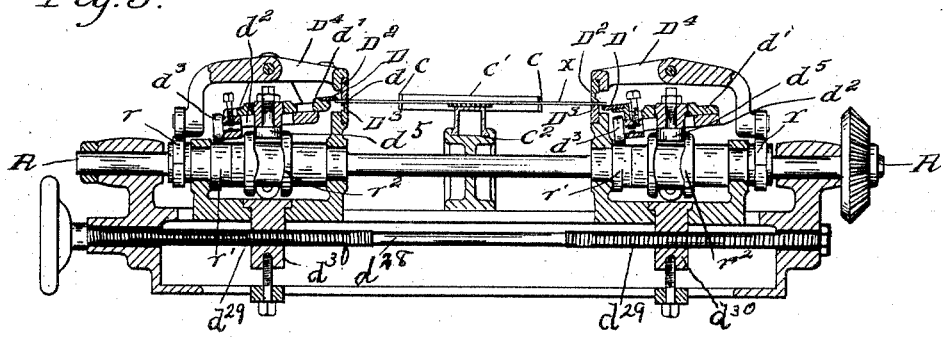
Fig. 9.
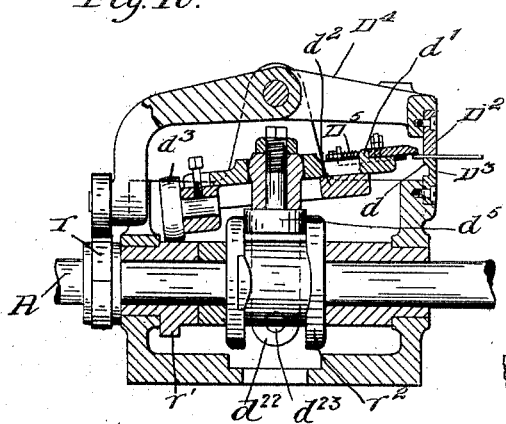
Fig. 10.
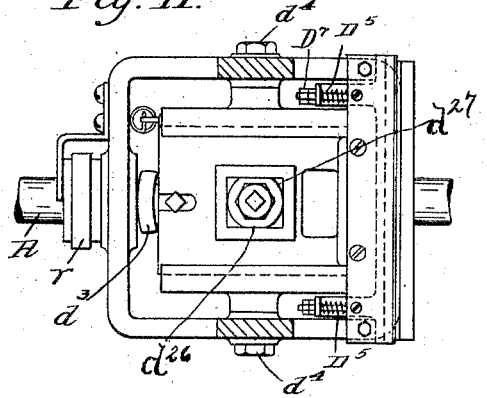
Fig. 11.
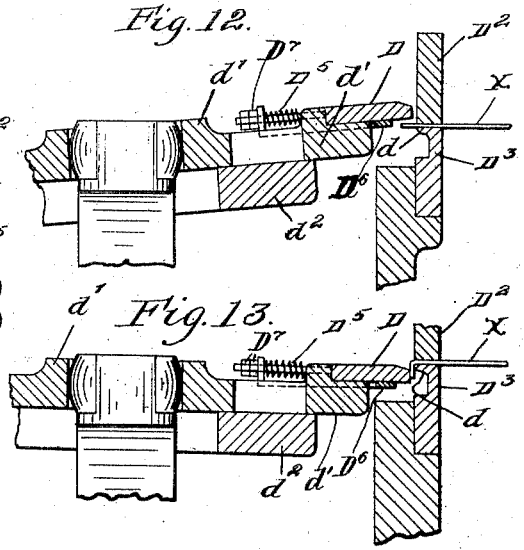
Fig. 12.
Fig. 13.
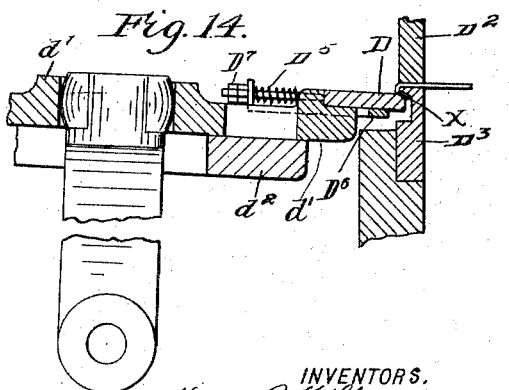
Fig. 14.
WITNESSES:
Wm. Geiger
A. W. Munday
INVENTORS.
Harry B. Williams
Frank M. Leavitt
BY
Munday, Evarts & Adcock
ATTORNEYS.

No. 775,880. PATENTED NOV. 22, 1904.
H. B. WILLIAMS & F. M. LEAVITT.
COMBINED CAN BODY FORMING AND SIDE SEAM SOLDERING MACHINE.
APPLICATION FILED MAY 16, 1902.
NO MODEL. 8 SHEETS—SHEET 6.
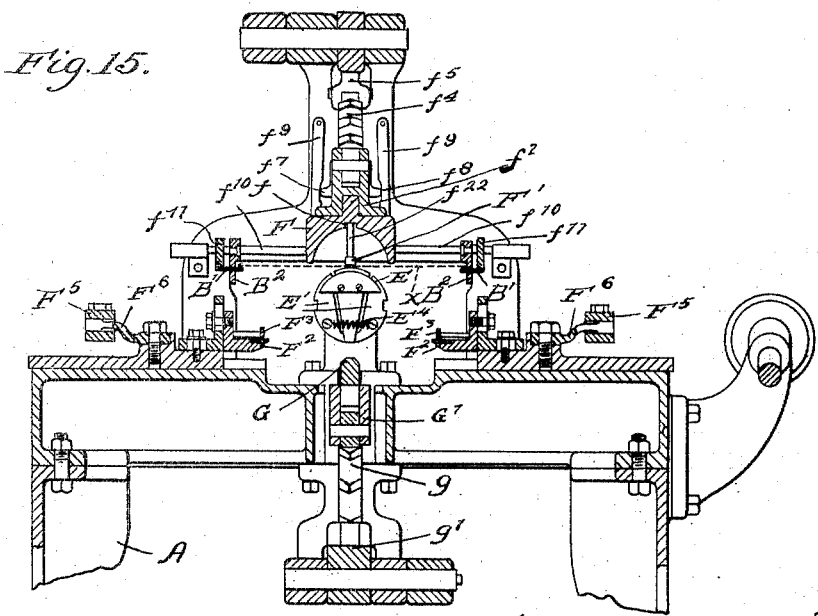
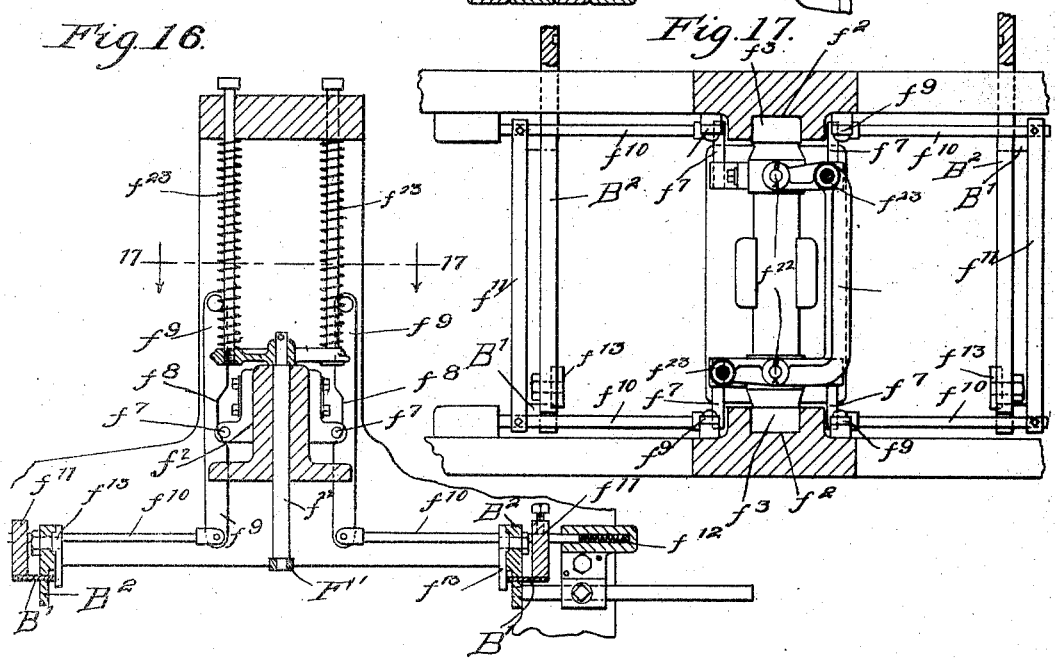
WITNESSES:
INVENTORS.
Harry B. Williams
Frank M. Leavitt
BY
Munday, Evarts & Adcock
ATTORNEYS.

No. 775,880. PATENTED NOV. 22, 1904.
H. B. WILLIAMS & F. M. LEAVITT.
COMBINED CAN BODY FORMING AND SIDE SEAM SOLDERING MACHINE.
APPLICATION FILED MAY 16, 1902.
NO MODEL. 8 SHEETS—SHEET 7.

WITNESSES:
Wm Geiger
A. W. Munday

INVENTORS,
Harry B. Williams.
Frank M. Leavitt.
BY
Munday, Evarts & Adcock
ATTORNEYS.

No. 775,880. PATENTED NOV. 22, 1904.
H. B. WILLIAMS & F. M. LEAVITT.
COMBINED CAN BODY FORMING AND SIDE SEAM SOLDERING MACHINE.
APPLICATION FILED MAY 16, 1902.
NO MODEL. 8 SHEETS—SHEET 8.

WITNESSES:
Wm. Geiger
H. W. Munday

INVENTORS
Harry B. Williams
Frank M. Leavitt.
BY
Munday, Evarts & Adcock,
ATTORNEYS.

No. 775,880. Patented November 22, 1904.

UNITED STATES PATENT OFFICE.

HARRY B. WILLIAMS AND FRANK M. LEAVITT, OF NEW YORK, N. Y., ASSIGNORS TO AMERICAN CAN COMPANY, OF JERSEY CITY, NEW JERSEY, A CORPORATION OF NEW JERSEY.

COMBINED CAN-BODY-FORMING AND SIDE-SEAM-SOLDERING MACHINE.

SPECIFICATION forming part of Letters Patent No. 775,880, dated November 22, 1904.

Application filed May 16, 1902. Serial No. 107,611. (No model.)

*To all whom it may concern:*

Be it known that we, HARRY B. WILLIAMS and FRANK M. LEAVITT, citizens of the United States, residing in New York, in the county of New York and State of New York, have invented a new and useful Improvement in a Combined Can-Body-Forming and Side-Seam-Soldering Machine, of which the following is a specification.

This invention relates to can-making machines or combined can-body-forming and side-seam-soldering machines.

The object of the invention is to provide a single machine of a simple, efficient, and durable construction, by means of which flat blanks may be automatically and economically formed into can-bodies having lock side seams duly soldered, and by which the can-bodies thus made may be produced accurately and uniformly of the size and diameter required and without waste of solder or smearing or coating the inside of the side seam with solder.

The invention consists in the means herein shown and described for accomplishing this object or result and in the novel construction of parts and devices and novel combinations of parts and devices herein shown or described.

Figure 5:
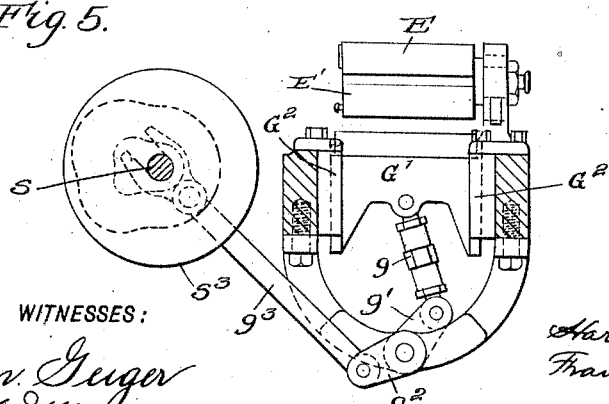
Figure 19:
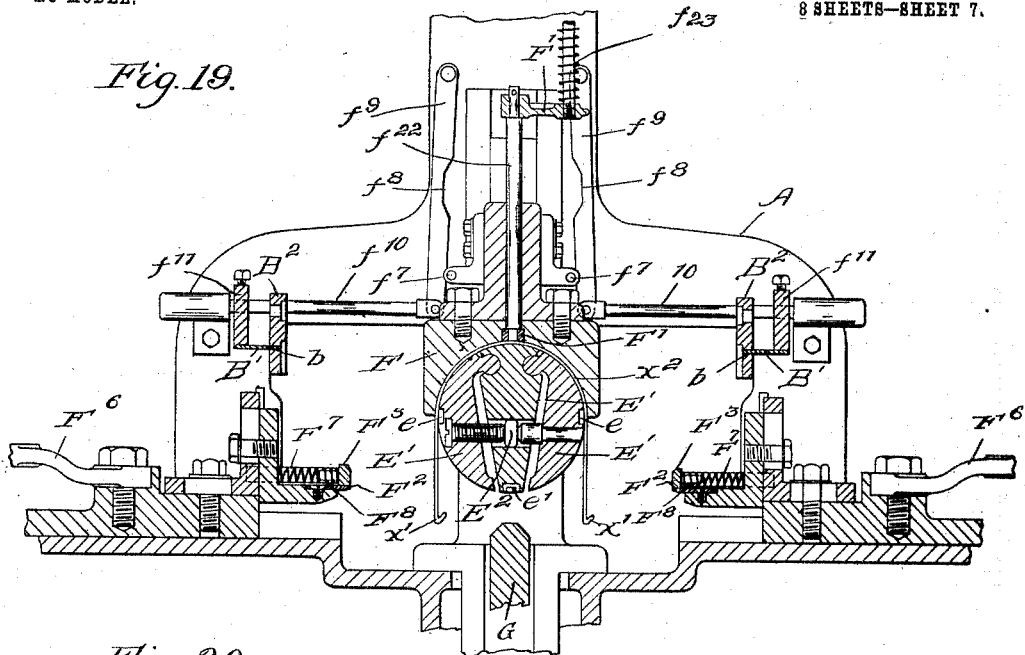
Figure 20:
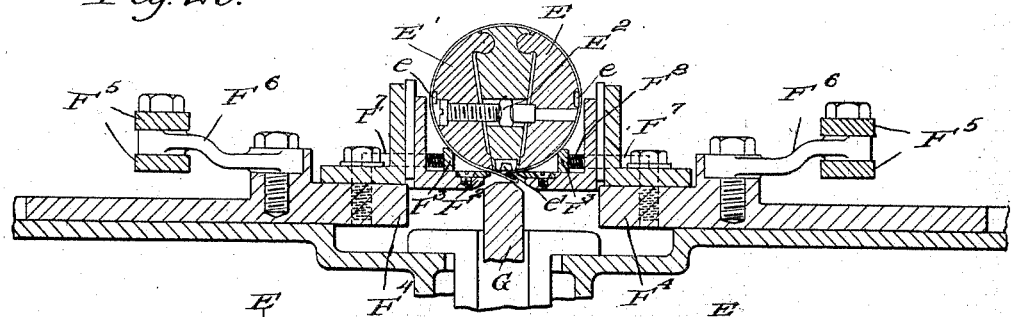
Figure 21:
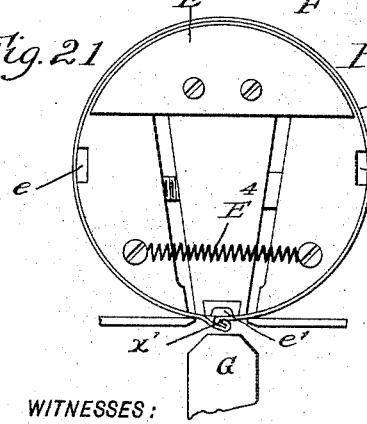
Figure 22:
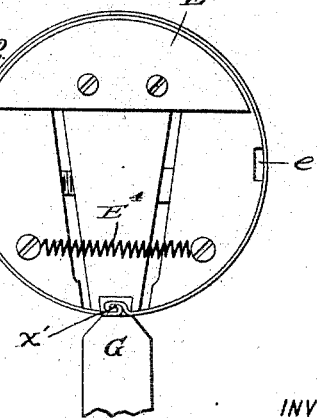
Figure 23:
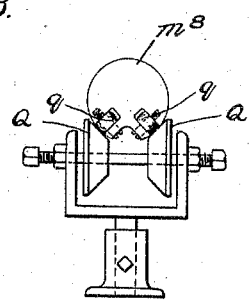
Figure 24:
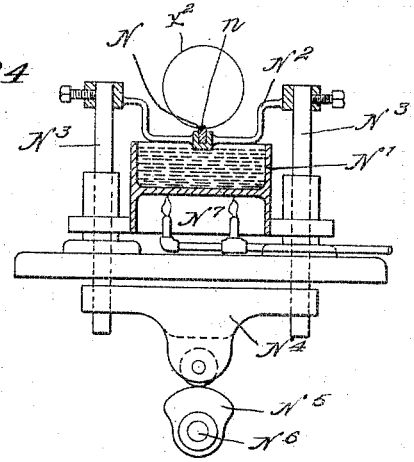
Figure 26:
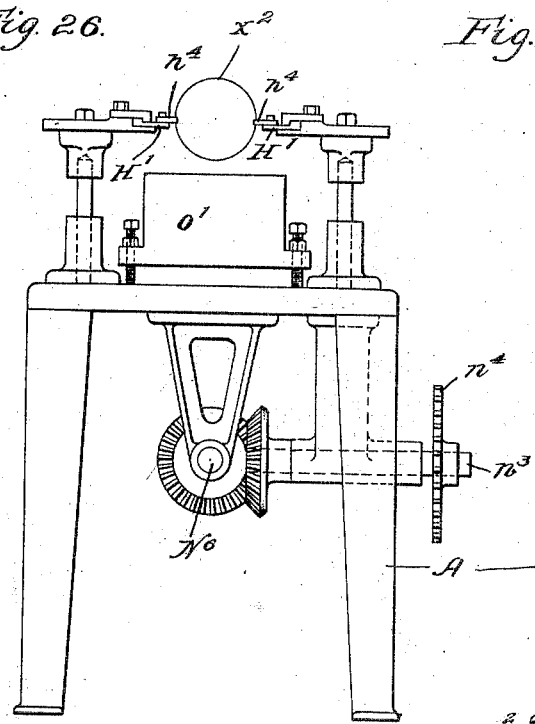
Figure 25:
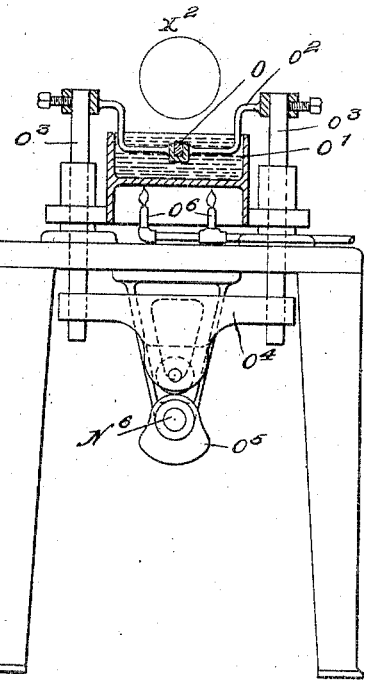
Figure 27:
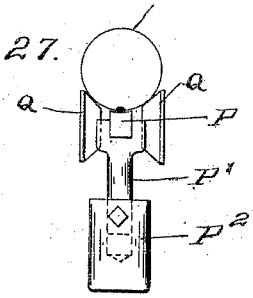

In the accompanying drawings, forming a part of this specification, Figure 1 is a plan view of a machine embodying the invention, only the horn of the body-forming mechanism being shown. Fig. 2 is a side elevation. Fig. 3 is a plan view of the body-former mechanism of the machine. Fig. 4 is a side elevation of the same. Fig. 5 is a detail view of parts hereinafter to be described. Fig. 6 is a plan view, and Fig. 7 an elevation, of the side-seam-soldering mechanism of the machine. Fig. 8 is a cross-section of the soldering-horn on the line 8 8 of Fig. 3. Fig. 9 is a vertical cross-section on line 9 9 of Fig. 3. Fig. 10 is an enlarged vertical section of one of the hook-former devices. Fig. 11 is a detail plan of one of the hook-former devices, partly in horizontal section. Figs. 12, 13, and 14 are views illustrating the operation of the hook-former devices. Fig. 15 is a detail vertical section on line 15 15 of Fig. 4. Fig. 16 is an enlarged detail view, partly in vertical section, showing the mechanism for operating the movable guides or supports for the blank. Fig. 17 is a horizontal section on line 17 17 of Fig. 16. Fig. 18 is a detail view of a part of the guide hereinafter to be described. Fig. 19 is a detail vertical cross-section on line 19 19 of Fig. 3 through the horn. Fig. 20 is a similar view illustrating the folders in a different position. Figs. 21 and 22 are end views of the body-former horn, illustrating the operation of the bumper or seam-squeezer. Fig. 23 is an end view of the soldering-horn, showing its support. Fig. 24 is a vertical section on line 24 24 of Fig. 7. Fig. 25 is a similar view taken on line 25 25 of Fig. 7 and illustrating the parts in a different position. Fig. 26 is an end view showing the reciprocating can-body feeders or pushers, and Fig. 27 is an end view showing the sweating-iron. Fig. 28 is a detail vertical cross-section of Fig. 10, taken centrally through the anti-friction-roller $d^5$.

In the drawings similar letters of reference indicate like parts throughout all the figures.

In said drawings, A represents the frame of the machine, and B B the feed-table guides or supports, upon or along which the flat can-body blanks $x$ are fed or moved by the reciprocating feed pawls or fingers C, pivoted at $C^{22}$ to the blank pusher-plates C' on the reciprocating feeder-slide $C^2$, the same being, for example, substantially similar in construction and operation to the corresponding feeder slide and pawls shown and described in the E. Jordan patent, No. 307,198, of October 28, 1884, to which reference is here made.

D and D' are a pair of rocking and reciprocating hook-formers or edge-folders operating in conjunction with the clamping-jaws $D^2$ and $D^3$, the upper one, $D^2$, of which is moved up and down by a vibrating yoke or lever $D^4$, actuated by a cam $r$ on the cam-shaft R. One of each pair of clamping-jaws has a projecting lip $d$, over which the hook or edge fold $x'$ is formed. The hook-former or edge-folder D operates to turn its hook or edge fold downward, while the corresponding hook-former or edge-folder D' turns its hook or edge fold upward, as will be clearly understood from Fig. 9. Each of the rocking and reciprocating hook-formers or edge-folders D D', is mounted upon a reciprocating slide $d'$, carried upon a rocking support $d^2$, furnished with an antifriction-roller $d^3$, and pivoted to the adjustable frame or carriage $d^{21}$ at $d^4$ and operated by a cam $r'$ on the shaft R, the slide $d'$ being operated by a cam $r^2$ on the shaft R, which cam engages an antifriction-roller $d^5$ on a swinging yoke $d^{22}$, pivoted to the adjustable frame or carriage $d^{21}$ at $d^{23}$, the head $d^{24}$ of which yoke passes through a slot $d^{25}$ in the rocking support $d^2$ and engages the slide $d'$. Each of the heads $d^{24}$ of the swinging yoke $d^{22}$ has flat faces $d^{26}$ at its sides, and rounded or curved faces $d^{27}$ at front and rear to permit of the necessary rocking movement of the edge-folding tools D D'. The slide $d'$ has a dovetail connection $d^{31}$ with its rocking support $d^2$, thus connecting the slide and support together while permitting the slide to reciprocate in respect to the support. The frames or carriages $d^{21}$ are adjustable to and from each other on the main frame A to enable the machine to operate upon can-body blanks of different lengths or to form edge folds thereon of different widths by an adjusting-screw $d^{28}$, the same having, preferably, right and left threads $d^{29}$, and which passes through nuts or threaded pieces $d^{30}$, secured to the adjustable frames or carriages $d^{21}$. The cams $r'$ and $r^2$ slide with the frames or carriages $d^{21}$ on the shaft R, the cams having shoulders or collars engaging the frames or carriages. As the frames or carriages $d^{21}$ carry the edge folding and clamping mechanisms, the adjustment of the frames or carriages to or from each other is all that is required to adjust the mechanism to the length of the blank and to the width of the edge fold required. The edge-folder D is furnished with a gage $D^6$ for the edge of the blank to abut against, said gage having an adjustable connection $D^7$ with the slide $d'$ and a spring $D^5$. The spring $D^5$ serves to hold the gage $D^6$ in its retracted position.

E is the body-former horn, the same being furnished with two hinged or opening and closing wings E' E', the wings being opened or expanded by a reciprocating wedge $E^2$ in the horn.

F is a vertically-reciprocating former which operates to fold the flat blank downwardly around the horn, as illustrated in Figs. 15 and 19. The guides B', which support the flat blank $x$, with the hooks or edge folds $x'$ formed thereon, above the horn, are made movable or adapted to retract, so as not to interfere with the forming or folding of the blank downward around the horn.

F' is a clamp for clasping the blank against the central portion of the horn, the same fitting in a suitable recess $f$ in the former F and being provided with sliding guide-rods $F^{22}$, to which it is attached. Springs $F^{23}$ actuate or yieldingly extend this clamp-bar F' in advance of the body-former F.

The body-former F is removably secured to a slide $f^2$, which is reciprocated up and down in suitable guides $f^3$ on the frame of the machine by means of the toggle arms or links $f^4 f^5$, the latter being on a lever $f^6$, which is actuated from the driving-shaft S, through the connecting-link S', by a cam similar to that illustrated in Fig. 5 for operating the bumper-slide G' through the toggles $g$ $g'$, lever $g^2$, and connecting-link $g^3$.

As the body-blank $x$, clamped against the horn E by the clamp-bar F', is bent or folded downward around the horn by the former F, the movable guides B', which support the blank, are retracted or withdrawn by means of projections $f^7$ on the body-former slide engaging cams or inclines $f^8$ on the hinged arms $f^9$, which are pivotally connected to links $f^{10}$, upon which the movable guides or blades B' are mounted through the adjustable connecting-bar $f^{11}$. Springs $f^{12}$ restore the guides or blades B' to position. The vertical plate $B^2$ of the guide is furnished with a slot $b$ to receive the horizontally-movable guide or blade B'. A stop $f^{13}$ limits the inward movement of the blade B'.

$F^2 F^2$ are the horizontally-movable folders which bend the ends of the blank around the horn and cause the hooks or edge folds thereon to overlap and interlock as the wings of the horn expand. Each of these folders $F^2$ carries a tension or spring held sliding member $F^3$ on its upper side, which serves to snugly wrap the blank around the horn. The folder $F^2$ and its sliding member $F^3$ are mounted upon a reciprocating slide $F^4$, which is actuated by a cam $S^2$ on the driving-shaft S through the connecting-lever $F^5$ and link $F^6$. The sliding member $F^3$ of each folder $F^2$ is attached to reciprocating guide-rods $F^7$ and is furnished with springs $F^8$.

After the hooks are lapped past each other, as illustrated in Fig. 20, the wings E' E' of the horn are opened or expanded by the wedge $E^2$ and the hooks caused to interlock or engage each other, and then the vertically-reciprocating bumper or seam-squeezer G compresses the seam against the horn, as will be readily understood from Figs. 20, 21, and 22. The bumper or seam-squeezer G is secured to a vertically-reciprocating slide G', mounted in suitable guides $G^2$ on the frame of the machine and operated through toggle-links $g$ $g'$, lever $g^2$, and connecting-link $g^3$ from the cam $S^3$ on the driving-shaft S. A spring $E^4$ connects the wings E' of the horn E. The horn E has grooves $e$ in its side to receive the extractor fingers or pawls which move the can-body forward from the position where it is formed, and also a groove $e'$ on its under side to give room for the seam formed by the interlocking hooks $x'$ on the can-body $x^2$.

The can-body-forwarding fingers or pawls H are actuated by reciprocating slides H', to which they are connected at $h^{22}$, which slides H' are attached by connecting-brackets $H^2$ with the slide $H^3$, reciprocating on suitable guides $H^4$, secured to the frame of the machine above the horn. The slide $H^3$ is reciprocated from the driving-shaft S through the connections $h$ $h'$ $h^2$ $h^3$. The pair of reciprocating slides H' on each side of the horn are also furnished with a series of can-body-forwarding pawls $h^4$, pivotally connected thereto, and by which the can-bodies are intermittently advanced over the soldering mechanism by a step-by-step movement first to the fluxing device, next to the solder-applying device, and next to the sweating-iron, the can-bodies being supported and maintained in position by a can-body guide-horn M, preferably of a skeleton form, attached to the end of the body-former horn E. The can-body guide-horn M is preferably composed of a series of small rods $m$, a pair of side bars $m'$, having grooves $m^2$ to receive the pawls $h^4$, and a bottom bar $m^3$, having a guide-groove $m^4$ to receive the seams of the can-bodies, and thus maintain the seam centrally with the guide-horn to properly register with the flux-applying device N, the solder-applying device O, and the sweating-iron P. The horn-rods $m$ and bars $m'$ and $m^3$ are all connected together by a cap $m^5$ and spacer or connecting pieces $m^6$ $m^7$, the cap $m^5$ being bolted or threaded to the end of the body-former horn.

N is the flux-applying device, the same consisting, preferably, of a vertically-movable bar somewhat exceeding the can-body in length and furnished with a narrow wick or absorbent pad $n$ on its upper grooved face, by means of which, in connection with the flux bath or vessel N', the flux may be applied to the seam in the limited quantity required and without smearing any unnecessary surface of the can-body on each side of the seam. The flux-applying bar N is carried upon a bent bar or yoke $N^2$, carried upon the vertically-reciprocating slides $N^3$, which are connected together by a cross-bar $N^4$ and moved up and down, as required, by a cam $N^5$ on the shaft $N^6$, which is geared to the driving-shaft S through the connecting gearing and mechanism $n'$ $n^2$ $n^3$ $n^4$ $n^5$ $n^6$ $n^7$ $n^8$ $n^9$.

The solder-applying device or bar O somewhat exceeds the can-body in length and is provided with a small groove $o$ in its upper face, by which a narrow line of solder is applied to the seam of the can-body when the same is stopped in position over the solder-applying bar. The solder-applying bar is moved up and down, as required, to immerse it in the solder bath or vessel O' and apply the solder to the can-body above by means of a vertically-movable bent bar or yoke $O^2$, upon which the solder-applying bar is mounted and which is connected to the vertically-reciprocating slides $O^3$, connected together by a cross-bar $O^4$ and operated by a cam $O^5$ on the shaft $N^6$.

The solder bath or vessel O is heated by burners $O^6$, and the flux bath or vessel N' is also preferably heated by similar burners $N^7$.

The sweating-iron P is secured to a vertically-adjustable standard P', supported on a bracket $P^2$, attached to the frame. Burners $P^3$ heat the sweating-iron. Near the outer end of the can-body skeleton guide-horn M are beveled supporting-rollers Q, the horn being furnished with coöperating rollers $q$, mounted on spacer $m^8$.

The can-body-blank feeder-slide $C^2$, carrying the blank-feeding pawls or fingers C, is reciprocated as required by means of a cam $S^4$ on the driving-shaft S through the connecting mechanism $C^3$ $C^4$ $C^5$ $C^6$ $C^7$.

The wedge $E^2$, by which the wings E' of the horn are operated, is reciprocated as required to open or expand the wings and permit the same to again contract by a cam $S^5$ on the driving-shaft through the connecting links and levers $E^5$ $E^6$ $E^7$.

In operation, the blanks being placed by hand or automatic feeding mechanism on the guides B, the first pair of feed-pawls C advance the blank into register with the hook-formers or edge-folding clamping-jaws $D^2$ $D^3$, and the edge-folders D and D' are then operated, as illustrated in Figs. 9, 10, 12, 13, and 14, to form oppositely-turned hooks or edge folds at the edges of the blank. The next reciprocating movement of the feeder-slide $C^2$ advances the blank over the horn E, and then the clamp-bar F' clamps the same at its middle against the horn and the former F folds it downwardly around the horn, as illustrated in Fig. 19, the movable guides or blades B' at this time retracting. The folders $F^2$ $F^2$ then close toward each other and complete the folding of the blank around the horn, as illustrated in Fig. 20, and the horn is then expanded to cause the hooks to interlock, and the seam-squeezer G is then moved up to compress the seam. The reciprocating can-body feeder-slides H' through the action of the fingers H strip the can-body from the horn, and by their subsequent reciprocations advance it first to the fluxing device, then to the soldering device, and then to the sweating device, and finally discharge it from the machine over the guide-horn M, it of course being understood that other can-body blanks and can-bodies are at the same time being advanced step by step and operated upon by the successive devices. The adjusting-screw $d^{28}$ turns loosely in the framework, and its right and left threads engaging the corresponding threads in the nuts or threaded pieces $d^{30}$, thus moves or adjusts the adjustable frames or carriages $d^{21}$ to and from each other.

We claim—

1. The can-making, or combined can-body-forming and side-seam-soldering machine, comprising in coöperative combination guides for the flat can-body blanks, a reciprocating blank-feeder slide furnished with two pairs of feeder pawls or fingers, a pair of rocking and reciprocating hook-formers or edge-folders, two pairs of clamping-jaws coöperating therewith, a can-body-former horn having expansible wings and an operating-wedge, a vertically-reciprocating former above the horn, a pair of horizontally-reciprocating folders, each having mounted thereon a movable tension or spring member, a vertically-reciprocating bumper or seam-squeezer below the horn, a flux bath or vessel, a vertically-reciprocating flux-applying bar, a solder bath or vessel, a vertically-reciprocating solder-applying bar, a sweating-iron, a can-body guide-horn extending from the end of the body-former horn over the flux bath or vessel, the solder bath or vessel and the sweating-iron, a reciprocating slide, carrying fingers for stripping the can-body from the body-former horn, and a series of pawls for advancing the can-bodies by a step-by-step movement to the flux-applying bar and vessel to the solder-applying bar and vessel and to the sweating-iron; whereby the can-body and solder-applying bar are maintained in longitudinal register while in contact; substantially as specified.

2. In a can-body-making, or combined can-body-forming and side-seam-soldering machine, the combination with two pairs of clamping-jaws for the ends of the flat blank, of two pairs of rocking and reciprocating edge-folders or hook-formers, an expansible body-former horn, a former and a pair of folders for bending the blank around the horn, a bumper or seam-squeezer, a flux bath or vessel and a vertically-movable flux-applying bar, a solder bath or vessel and a vertically-movable solder-applying bar, a sweating-iron, a can-body guide-horn extending from the end of the forming-horn over the fluxing bar and vessel, the solder-applying bar and vessel and the sweating-iron, and means for advancing the blanks and the can-bodies by a step-by-step movement from the edge-folders or hook-formers, successively to the body-former horn, the fluxing device, the soldering device and the sweating device; whereby the can-body and solder-applying bar are maintained in longitudinal register while in contact, substantially as specified.

3. In a can-body-making machine, the combination with a can-body-forming horn, and means for forming the blank around the horn, of a molten-solder vessel, a vertically-movable solder-applying bar therein, a can-body guide-horn extending from the end of the body-former horn over the same, and means for advancing the can-bodies from the horn to the solder-applying vessel and bar; whereby the can-body and solder-applying bar are maintained in longitudinal register while in contact, substantially as specified.

4. In a can-body-making machine, the combination with edge-folders or hook-formers, of a body-former horn, means for forming the body around the horn, a fluxing device, a molten-solder vessel, a vertically-reciprocating solder-applying bar therein, a can-body guide-horn extending from the end of the body-former horn, and means for advancing the can-bodies by a step-by-step movement; whereby the can-body and solder-applying bar are maintained in longitudinal register while in contact, substantially as specified.

5. In a can-body-making machine, the combination with edge-folders or hook-formers, of a body-former horn, means for forming the body around the horn, a fluxing device, a molten-solder vessel, a vertically-reciprocating solder-applying bar therein, a can-body guide-horn extending from the end of the can-body-former horn, and means for advancing the can-bodies by a step-by-step movement; whereby the can-body and solder-applying bar are maintained in longitudinal register while in contact, substantially as specified.

6. In a can-body-making machine, the combination with a can-body-former horn and means for folding the blank around the horn, a guide-horn extending from the end of the body-former horn to the solder vessel, a solder-applying bar in the solder vessel having a groove on its upper face, and means for moving said bar into the molten solder to receive a supply thereof and upward to bring it into contact with the can-body, and means for intermittently advancing the can-body; whereby the can-body and solder-applying bar are maintained in longitudinal register while in contact, substantially as specified.

7. In a can-body-making machine, the combination with a can-body-former horn and means for folding the blank around the horn, of a guide-horn extending from the end of the body-former horn to the solder vessel, a solder-applying bar, and means for moving said bar into the molten solder to receive a supply thereof and upward to bring it into contact with the can-body, and means for intermittently advancing the can-body; whereby the can-body and solder-applying bar are maintained in longitudinal register while in contact, substantially as specified.

8. In a can-body-making machine, the combination with a can-body-former horn, of a guide-horn extending from the end thereof having a guide-groove for the side seam centrally on its lower side, a molten-solder vessel, and a vertically-movable solder-applying bar therein, means for intermittently advancing the can-bodies and means for vertically moving the solder-applying bar; whereby the can-body and solder-applying bar are maintained in longitudinal register while in contact, substantially as specified.

9. In a can-body-making machine, the combination with a can-body-former horn, of a guide-horn extending from the end thereof having a guide-groove for the side seam centrally on its lower side, a molten-solder vessel, a vertically-movable solder-applying bar, and a sweating-iron, means for intermittently advancing the can-bodies and means for vertically moving the solder-applying bar; whereby the can-body and solder-applying bar are maintained in longitudinal register while in contact, substantially as specified.

10. In a can-body-making machine, the combination with guides for the flat can-body blanks, of a horizontally-reciprocating feeder-slide furnished with two pairs of feeder pawls or fingers, a pair of vertically-rocking and reciprocating hook-formers or edge-folders each secured to a reciprocating slide mounted upon a rocking support, two pairs of clamping-jaws coöperating therewith, a can-body-former horn having expansible wings, a vertically-reciprocating former above the horn, a pair of horizontal reciprocating folders each having mounted thereon a movable tension or spring member, a vertically-reciprocating bumper or seam-squeezer below the horn, a guide-horn for the can-bodies, means for moving the can-bodies along the guide-horn, and means for soldering the side seam, substantially as specified.

11. In a can-body-making machine, the combination with guides for the flat blank, of a reciprocating feeder-slide having fingers or pawls to engage the blanks, of a pair of rocking and reciprocating hook-formers or edge-folders, two reciprocating slides to which said edge-folders are secured, two rocking supports upon which said slides are mounted to reciprocate, and two pairs of clamping-jaws coöperating therewith, substantially as specified.

12. In a can-body-making machine, the combination with a reciprocating feeder slide for the blanks furnished with feeder fingers or pawls, of a pair of vertically-rocking and horizontally-reciprocating hook-formers or edge-folders, each secured to a reciprocating slide mounted upon a rocking support, and two pairs of clamping-jaws coöperating therewith, one jaw of each pair having a lip over which the edge fold is formed, substantially as specified.

13. In a can-body-making machine, the combination with a reciprocating feeder-slide for the blanks furnished with feeder fingers or pawls, of a pair of vertically-rocking and horizontally-reciprocating hook-formers or edge-folders, each secured to a reciprocating slide mounted upon a rocking support, and two pairs of clamping-jaws coöperating therewith, one jaw of each pair having a lip over which the edge fold is formed, and a cam-shaft having cams for rocking and reciprocating the edge-folders and for opening and closing the clamping-jaws, substantially as specified.

14. In a can-body-making machine, the combination with a reciprocating feeder-slide for the blanks furnished with feeder fingers or pawls, of a pair of vertically-rocking and horizontally-reciprocating hook-formers or edge-folders, and two pairs of clamping-jaws coöperating therewith, one jaw of each pair having a lip over which the edge fold is formed, said rocking and reciprocating edge-folders each being secured to an independently-reciprocating slide mounted upon a rocking support, substantially as specified.

15. In a can-making machine, the combination with a pair of clamping-jaws $D^2$ $D^3$, of a vertically-rocking support $d^2$, a horizontally-reciprocating slide $d'$ on said rocking support, and a hook-former or edge-folder D furnished with a gage $D^6$ having an adjustable connection with said slide $d'$, substantially as specified.

16. In a can-body-making machine, the combination with a can-body-former horn, of a guide-horn extending from the end thereof having a guide-groove for the side seam centrally on its lower side, a molten-solder vessel, a vertically-movable solder-applying bar, a sweating-iron, and means for intermittently advancing the can-bodies; whereby the can-body and solder-applying bar are maintained in longitudinal register while in contact, substantially as specified.

17. In a can-body-making machine, the combination with a can-body-former horn, of means for folding or forming the blank around the horn into a can-body, a molten-solder vessel, a vertically-movable solder-applying bar therein, and a skeleton guide-horn having grooved side bars and a grooved bottom bar, and reciprocating slides furnished with a series of pawls or fingers for intermittently advancing the can-bodies; whereby the can-body and solder-applying bar are maintained in longitudinal register while in contact, substantially as specified.

18. In a can-body-making machine, the combination with a can-body-former horn, of means for folding or forming the blank around the horn into a can-body, a molten-solder vessel, a vertically-movable solder-applying bar therein, a sweating-iron, a skeleton guide-horn having grooved side bars and a grooved bottom bar, and reciprocating slide furnished with a series of pawls or fingers for intermittently advancing the can-bodies; whereby the can-body and solder-applying bar are maintained in longitudinal register while in contact, substantially as specified.

19. In a can-body-making machine, the combination with a can-body-former horn, of means for folding or forming the blank around the horn into a can-body, a molten-solder vessel, a vertically-movable solder-applying bar therein, a fluxing device and a sweating-iron, a skeleton guide-horn having grooved side bars and a grooved bottom bar, and a reciprocating slide furnished with a series of pawls or fingers for intermittently advancing the can-bodies; whereby the can-body and solder-applying bar are maintained in longitudinal register while in contact, substantially as specified.

20. In a can-body-making machine, the combination with guides for the flat blanks, of a reciprocating feeder-slide provided with plates for supporting the middle portion of the blank, and two pairs of pawls for advancing the blanks, two pairs of clamping-jaws, a pair of rocking and reciprocating edge-folders, each secured to a reciprocating slide mounted upon a rocking support, a body-former horn, means for forming the blank around the horn, a seam-squeezer, a side-seam-soldering mechanism, and means for advancing the can-bodies from the body-former horn to the side-seam-soldering mechanism; whereby the can-body and solder-applying bar are maintained in longitudinal register while in contact, substantially as specified.

21. In a can-body-making machine, the combination with guides for the flat blanks, of a reciprocating feeder-slide provided with plates for supporting the middle portion of the blank, and two pairs of pawls for advancing the blanks, two pairs of clamping-jaws, a pair of rocking and reciprocating edge-folders, each secured to a reciprocating slide mounted upon a rocking support, a body-former horn, a reciprocating former above the horn, a pair of horizontally-reciprocating folders each having an adjustable gage, a seam-squeezer, a side-seam-soldering mechanism, and means for advancing the can-bodies from the body-former horn to the side-seam-soldering mechanism; whereby the can-body and solder-applying bar are maintained in longitudinal register while in contact, substantially as specified.

22. The combination with a body-former horn and means for forming or folding the blank around the horn, of a guide-horn extending from the end of the body-former horn, feeder-slides on each side of said guide-horn furnished with a series of pawls or fingers for advancing the can-bodies from the body-former horn by a step-by-step movement, a flux vessel and a flux-applying device below said guide-horn, and a molten-solder vessel and a vertically-movable solder-applying bar below said guide-horn; whereby the can-body and solder-applying bar are maintained in longitudinal register while in contact, substantially as specified.

23. The combination with a body-former horn and means for forming or folding the blank around the horn, of a guide-horn extending from the end of the can-body-former horn, feeder-slides on each side of said guide-horn furnished with a series of pawls or fingers for advancing the can-bodies from the body-former horn by a step-by-step movement, a flux vessel and a flux-applying device below said guide-horn, a molten-solder vessel and a vertically-movable solder-applying bar below said guide-horn, and a sweating-iron; whereby the can-body and solder-applying bar are maintained in longitudinal register while in contact, substantially as specified.

24. In an edge-folding mechanism, the combination of a frame provided with a clamp-support, means for clamping the blank on said support, a swinging tool-frame pivoted on said frame, an edge-folding tool mounted to slide forwardly and backwardly on said swinging tool-frame, and mechanism for operating said clamping means, then swinging the tool-frame and tool for bending the edge of the blank, and then sliding the tool forward in the tool-frame to fold the bent edge of the blank back, substantially as set forth.

25. In an edge-folding mechanism, the combination of a frame provided with a support for the blank, a clamping-lever pivoted on said frame to move toward and from said blank-support, a swinging tool-frame pivoted on said frame, a folding-tool mounted to slide forwardly and backwardly on said swinging tool-frame, and mechanism for swinging said clamping-lever toward the blank-support for clamping the blank, then swinging the tool-frame and tool for bending the edge of the blank, and then sliding the tool forward in the tool-frame to fold the bent edge of the blank back, substantially as set forth.

26. The combination of a stationary main frame, separate frames for two edge-folding mechanisms adjustably mounted on said stationary frame and each provided at its inner end with a support for the blank, a clamping-lever pivoted on each adjustable frame to move toward and from the blank-support thereof, a swinging tool-frame pivoted on said adjustable frame, a folding-tool mounted to slide inwardly and outwardly on said tool-frame, and mechanism for successively swinging the clamping-lever, swinging the tool-frame and sliding the folding-tool on each adjustable frame, substantially as specified.

27. The combination of two carriages movable toward and from each other, a clamping-lever and folding-tool mounted on each carriage, a shaft extending in the direction of movement of said carriages, and cams mounted on said shaft and movable with said carriages for operating said clamping-levers and folding-tools, substantially as set forth.

HARRY B. WILLIAMS.
FRANK M. LEAVITT.

Witnesses:
 FRED WHITE,
 THOMAS F. WALLACE.